J. F. DUNN.

CLOCK.

APPLICATION FILED FEB. 27, 1922.

Reissued May 9, 1922.

15,348.

3 SHEETS—SHEET 1.

Inventor

Joseph F. Dunn

By Jacob Eberman his Attorney

J. F. DUNN.

CLOCK.

APPLICATION FILED FEB. 27, 1922.

Reissued May 9, 1922. 15,348.

3 SHEETS—SHEET 2.

Inventor
Joseph F. Dunn
by Jacob S. Lieberman
his Attorney

J. F. DUNN.

CLOCK.

APPLICATION FILED FEB. 27, 1922.

Reissued May 9, 1922.

15,348.

3 SHEETS—SHEET 3.

Inventor
Joseph F. Dunn
By Jacob Shiberman
his Attorney

UNITED STATES PATENT OFFICE.

JOSEPH F. DUNN, OF NEW YORK, N. Y.

CLOCK.

15,348. Specification of Reissued Letters Patent. Reissued May 9, 1922.

Original No. 1,270,706, dated June 25, 1918, Serial No. 855,610, filed August 7, 1914. Application for reissue filed February 27, 1922. Serial No. 539,808.

*To all whom it may concern:*

Be it known that I, JOSEPH F. DUNN, a citizen of the United States, residing at New York city, in the county of New York and State of New York, have invented new and useful Improvements in Clocks, of which the following is a specification.

This invention relates to improvements in clocks and more particularly to mechanism for predetermining the release of the alarm of alarm clocks.

It is the object of this invention to construct the releasing mechanism of an alarm clock so that it will operate to release the alarm on an exact predetermined hour and minute. It is also an object of this invention to provide in addition to the usual alarm hour indicator on the alarm dial an alarm minute indicator which travels on the time dial or on the alarm dial correspondingly with the alarm hour indicator on its own dial and its position will indicate the exact minute the mechanism will release the alarm. In the usual alarm clock the hours on the alarm dial are indicated in the same manner and correspond to the hour designating numerals upon the clock face but in setting the alarm the indicator travels counter clockwise upon its dial. It is also an object of this invention to construct the alarm minute indicator to travel clock-wise upon the clock dial so that there will be no confusion in setting the alarm.

The advantages of this invention are obvious. The usual alarm clock is provided with a small alarm indicating dial over which travels in a counter clock-wise direction a single indicator in the form of a small clock hand. This dial is divided into hours, quarters, and halves, so that the exact minute the alarm will be released is a matter of conjecture when set between the divisions on the dial. By the construction contemplated in this invention, the exact minute of release may be determined.

A further advantage is the arrangement whereby the alarm minute indicator travels clock-wise about the clock face over the hour and minute numerals thereon, as confusion arises in calculating minutes in a counter clock-wise moving indicator.

While the preferred forms of this invention are illustrated upon the accompanying sheets of drawing, yet is it to be understood that minor detail changes may be made without departing from the scope thereof.

Fig. 7 is a similar view of another modification with parts broken away.

Figure 1:
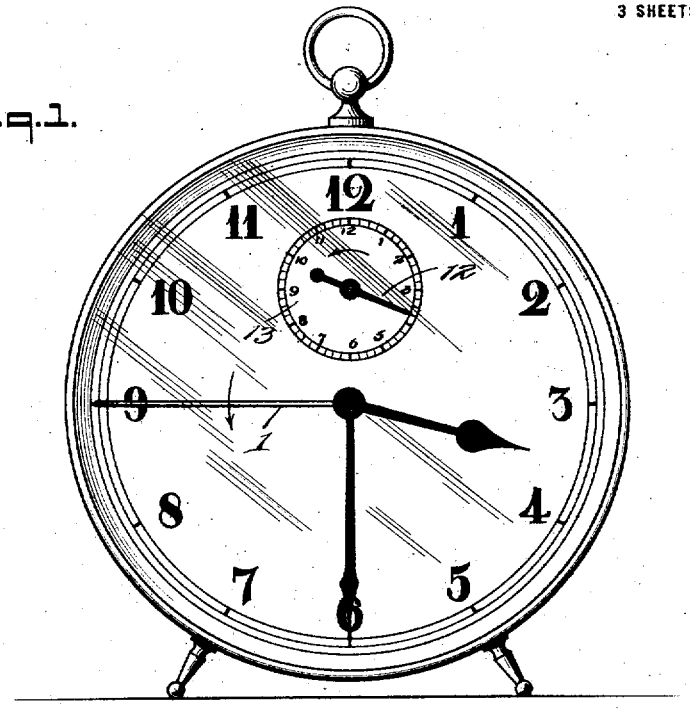
Figure 1 is a view in front elevation of an alarm clock embodying this invention.
Figure 2:
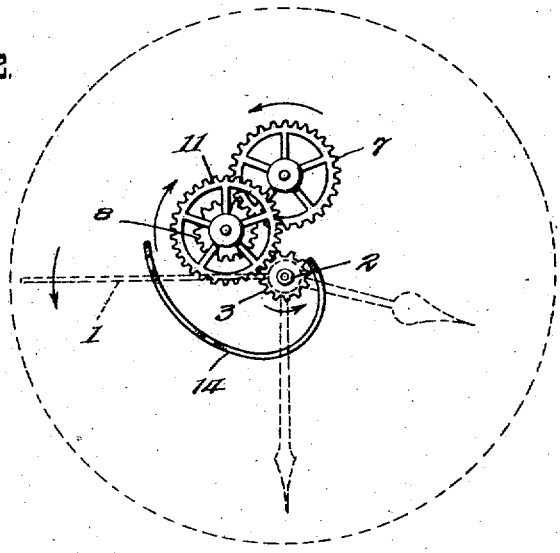
Fig. 2 is a diagrammatical view in front elevation illustrating the train of gears between the alarm hour and minute indicators.
Figure 3:
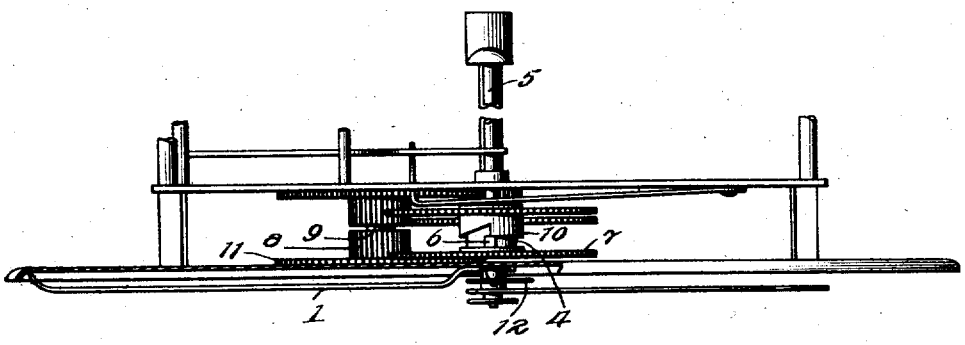
Fig. 3 is an enlarged top plan view of the Fig. 2 with parts broken away and the clock mechanism omitted.
Figure 4:
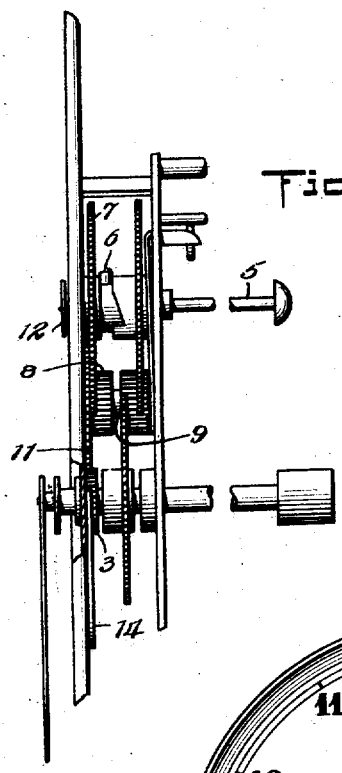
Fig. 4 is a view in side elevation of Fig. 2, looking from the right.
Figure 5:
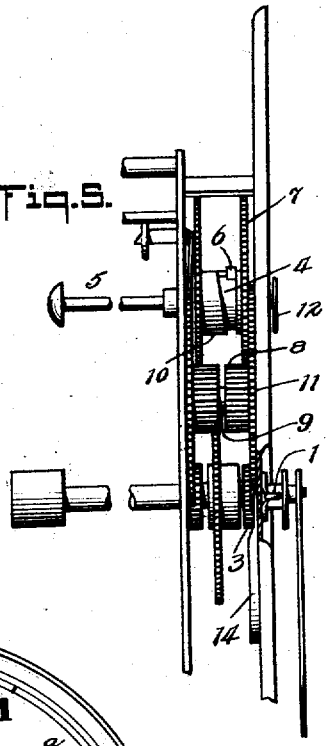
Fig. 5 is a similar view taken from the left.
Figure 6:
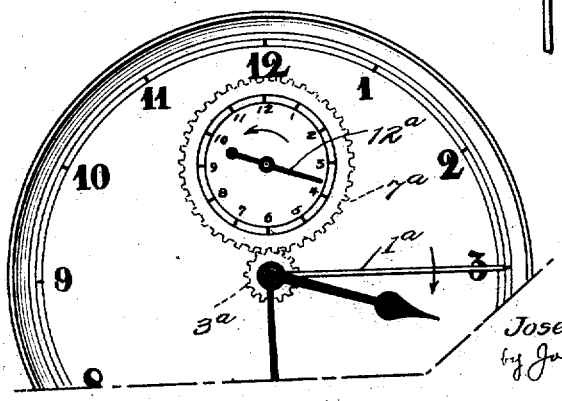
Fig. 6 is a view in front elevation of a clock illustrating a modified form of this invention.
Figure 2:
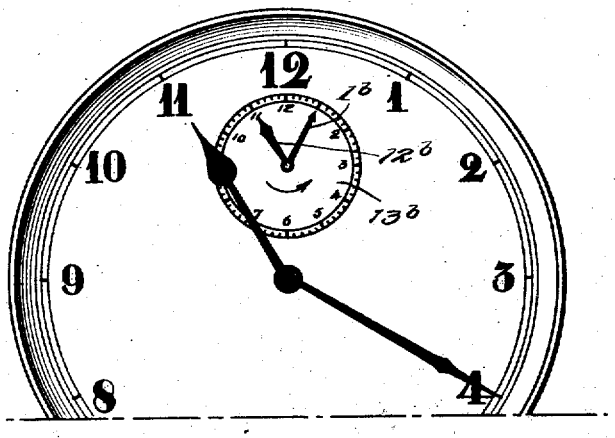

In all forms illustrated the usual clock mechanism is omitted as it forms no part of this invention.

In Figs. 1 to 6 inclusive, the clock face, hour and minute hands, alarm dial, alarm indicator and mechanism, as well as the means of setting the clock hands and alarm indicators are of the usual construction. In this form an alarm minute indicator 1, preferably in the form of a finger or arm of different color from the hour and minute hands of the clock, is secured on the outer side of the clock face upon a sleeve 2 loosely mounted upon the hour hand sleeve, passing through the clock face and is provided with a pinion 3 at the inner side thereof. The disk 4 on the alarm hour indicator spindle 5 which carries the alarm release key 6 is provided with a gear wheel 7 which meshes with a pinion 8 on the arbor 9 of the usual transmission gear to the alarm releasing sleeve 10. This pinion 8 is provided with a gear wheel 11 meshing with the pinion 3 of the alarm minute indicator, and the relation of the pinion and gears 3, 11, 8 and 7 is such that the alarm minute indicator 1 will make one complete revolution during the movement of the alarm indicator 12 through one hour division on the alarm dial 13.

As illustrated on Fig. 1 the alarm is set for three-forty-five and a continued movement of the alarm setting mechanism will cause the alarm minute indicator to travel counter clock-wise over the time dial over the minute divisions approaching the hour of three as the alarm hour indicator passes over the corresponding divisions on the alarm dial and the motion of both indicators will continue in this manner until the desired hour and minute for the release of the alarm has been reached.

In this form the numerals on both time and alarm dials are arranged in the same relation but, as both the alarm hour and minute indicators revolve in a counter clockwise direction, the reading on the alarm dial is in a reverse direction, for example, in Fig. 1 the hour indicator is set at three-forty-five and passes from there through three-thirty and three-fifteen to three o'clock and so on, and as the movement of the alarm minute hand is the same as the alarm hour hand the minutes are read directly upon the time dial, for instance, the position of the alarm minute indicator on Fig. 1 indicates three-forty-five the same as if the time minute hand was in this position.

A spring 14 may be secured upon the inner side of the clock face to bear upon the alarm minute indicator pinion 3 to cause it to move evenly and retain its position when at rest.

In the form above described both the alarm hour and minute indicators move about the time and alarm dials in a counter clock-wise direction which may be confusing to one not familiar with this operation and manner of reading. A construction is illustrated on Fig. 6 by which the alarm minute indicator $1^a$ moves clock-wise about the clock dial while the alarm indicator $12^a$ moves counter clockwise about the alarm dial in the usual manner. This is accomplished by constructing the alarm minute indicator pinion $3^a$ to mesh with the gear $7^a$ carried upon the alarm mechanism spindle. By constructing the pinion $3^a$ and gear wheel $7^a$ in proper proportions the alarm minute indicator will designate the exact minute upon the time dial after the hour designated upon the alarm dial that the alarm will be released. The position of the alarm indicators on Fig. 6 indicates that the alarm will be released at three-forty-five.

Figure 8:
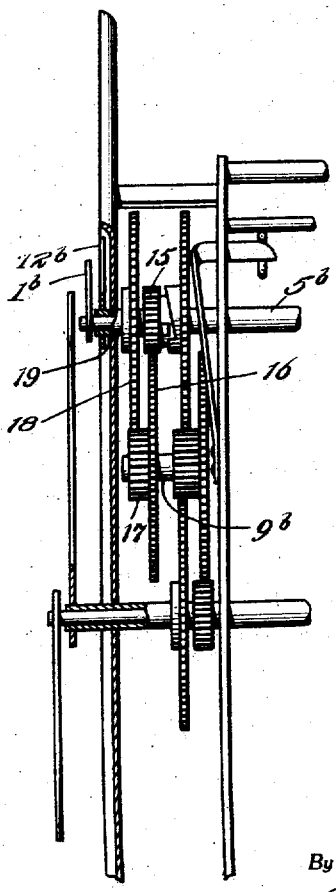
Fig. 8 is an enlarged view of the construction of Fig. 7 in side elevation looking from the right, with parts broken away and the clock mechanism omitted.

Another manner of carrying out this invention, which contemplates essentially the providing of an alarm minute indicator moving in conjunction with the alarm hour indicator, is illustrated in Figs. 7 and 8 in which both the alarm indicators are arranged to travel upon the alarm dial and are read in the same manner as in the construction illustrated in Fig. 1. This is accomplished by mounting a pinion 15 upon the key carrying disk of the alarm spindle $5^b$ meshing with a gear wheel 16 loosely mounted upon the arbor $9^b$ of the alarm transmission train of gears. This gear wheel is provided with a pinion 17 which in turn meshes with a gear wheel 18 carried upon a sleeve 19 loosely mounted upon the alarm setting spindle $5^b$. This sleeve 19 passes through the clock face and carries on the outer side the alarm hour indicator $12^b$, the alarm minute indicator $1^b$ being carried upon the spindle $5^b$. The pinions and gear wheels 15, 16, 17 and 18 are so arranged and proportioned that upon the passage of the alarm hour indicator through one hour division on the alarm dial $13^b$ the alarm minute indicator makes a complete revolution of the dial.

Upon this alarm dial the alarm indicators $1^b$ and $12^b$ move in the same direction, counter-clockwise.

What I claim is:

1. In a device of the character described including an alarm setting and releasing mechanism including an alarm transmission gearing and arbor having an alarm setting spindle carrying an hour indicator upon the clock face, a release key carrying disk upon the spindle, an alarm minute indicator upon the clock face, a sleeve carrying the minute indicator passing through the clock face, and gears upon the key disk and minute sleeve meshing with gears on the arbor of the alarm transmission gearing, whereby the indicators are moved concurrently to cause the minute indicator to make a complete revolution as the hour indicator moves through one hour division.

2. The combination of an alarm mechanism, a time mechanism having time indicating devices and means for releasing said alarm mechanism, including an alarm setting spindle, means for setting said alarm mechanism relative to the time mechanism, and indicating devices which show the setting of the alarm mechanism, comprising an hour indicator mounted on the alarm spindle, a separate minute indicator mounted on a sleeve passing through the clock face, and gearing connecting said hour and minute indicators whereby they are moved together at different speeds respectively in the proportion of one to twelve in the setting of said alarm mechanism.

3. The combination of an alarm mechanism, a time mechanism having hour and minute hands and means for releasing said alarm mechanism including an alarm setting spindle, means for setting said alarm mechanism relative to the time mechanism, and indicating devices which show the setting of the alarm mechanism, comprising an alarm hour hand mounted on the alarm spindle, a separate alarm minute hand mounted on a sleeve passing through the clock face, and gearing directly connecting said alarm hour and minute hands to move together at the different speeds of one to twelve respectively in the setting of the alarm mechanism.

4. In an alarm clock, an alarm setting and releasing mechanism, an alarm dial, an alarm hour indicator, an alarm minute indicator, both concentrically mounted on the alarm dial, and means for causing the minute indicator to move in time relation with the setting of the hour indicator at a speed of twelve revolutions to one.

Signed at New York city, in the county of New York and State of New York, this 8th day of February, 1922.

JOSEPH F. DUNN. [L. S.]